Patent 3,057,740

3,057,740
INORGANIC BINDER FOR REFRACTORY MATERIALS
John H. S. Skoning, Los Angeles, Calif.
(5960 Tuxedo Terrace, Hollywood 28, Calif.)
No Drawing. Filed Aug. 5, 1959, Ser. No. 831,707
5 Claims. (Cl. 106—38.9)

My invention relates to a new and novel inorganic binder, that is preferably in a liquid form, and which may be used for binding various refractory materials that are used in casting operations, such as the molding sand used for the mold or core body materials in foundry practice.

The invention also relates to a method of making and using the same.

An object of my invention is to provide a novel, inexpensive and highly efficient binder for refractory materials used in foundries for metal casting operations.

Another object is to provide a novel composition of matter that may be efficiently used under high temperatures for use as a body or core material in foundry casting operations; and which will not generate any appreciably noticeable amount of gas in the mold when the molten metal is introduced into the mold and in contact with the material, and which will not contaminate the metal, and which is non-hydroscopic or hygroscopic, and which is also suitable for ferrous or nonferrous metals.

A further object is to provide a novel composition of matter of the above character that is dimensionally stable, and which will not swell or sag, either in the mold or core, and one which is substantially free from oxidation or polymerization during cure.

A still further object of my invention is to provide a novel binder which will satisfactorily bond all types of foundry grains, including the so-called synthetics; one which will easily and quickly coat the grains of the body materials, one that has good wettability and molding characteristics and which may be used on all conventional patterns, regardless of the materials that the patterns are made of, and that has good pattern release.

Other objects and advantages are to provide a novel binder for foundry grains whereby mold sands treated with my novel binder may be heated for hot mold pouring of metal; that will provide a mold material that has good metal flow and lay of metal, good friability and shake-out of the core and mold material; and which binder material is non-toxic and non-injurious to the hands of the workman; and also permits the mold materials to be re-used as a back-up material for subsequent molding operations, and which materials are devoid of organic contamination.

Yet another object is to provide a novel binder for foundry grains which when treated with my binder will enable the time for core oven curing to be reduced approximately 50% or more at normal low temperatures of about 400° F., and in which large molds may be torch or burner cured.

The invention includes the combination of ingredients which make a novel binder solution for foundry grains, the combination of such a solution with the foundry grains, as well as the method of making the binder solution and the use of the same.

Other objects, advantages and features of invention may appear from the subjoined detail description, and the appended claims.

In my invention I have discovered that a very highly satisfactory binder solution for foundry grains of the character hereinafter set forth may be effectively compounded and used for treating foundry grains used in foundry molds and cores, whereby such refractory materials may be economically manufactured, the use of which will give highly satisfactory results, and which may be re-used over and over again (at least for back-up materials in the mold).

In carrying out my invention, I first prepare a liquid binder solution in a suitable impeller type liquid mixer whereby rapid agitation of the liquids may be accomplished. This solution is a mixture of chemicals that may be denominated as a binder, a binder solution or as a binding material; and comprises dissolving sodium hexa meta phosphate ($Na_{16}P_{14}O_{43}$) granular type, in a liquid mono aluminum phosphate 50% concentration, and the typical analysis of which is: $P_2O_5$—33.7%; $Al_2O_3$—8%, viscosity at 25° C., cps. (centipoise viscosity)—approx. 500, specific gravity, 25 to 15.5° C.—1.45. It should be noted that when sodium hexametaphosphate is recited in the claims, the above-identified compound is referred to.

The typical analysis of the granular type of sodium hexa meta phosphate ($Na_1 P_{14}O_{43}$) is:

$P_2O_5$ ---------------------------------- 67% min.
$Na_2O$ ---------------------------------- 33% max.

The percentages of the above chemicals to make the binder solution is as follows; to wit:

Mono aluminum phosphate _____ Approx. 60 to 80% by weight
Sodium hexa meta phosphate _____ Approx. 40 to 20% by weight To these chemicals I add distilled water $H_2O$ in an amount of approximately 5% to 20% by weight, to vary the binder viscosity, that in turn varies the bonding strength of the binder, i.e., the more water added, the less strength the binder will have.

The chemicals are preferably mixed by placing the mono aluminum phosphate in an impeller type liquid mixer and to which the granular type sodium hexa meta phosphate is added, as well as the desired amount of water, and the same are rapidly agitated therein to obtain a thorough mixture of such chemicals to make the binder solution.

This binder solution is then added or introduced into the sand or body mix within a mixer, or muller, in a conventional manner; and the proportion by weight of the binder to the weight of the sand or body weight will vary with the grain size of the sand or body material. The finer the sand or body material, the greater amount of binder solution will be necessary to thoroughly coat each of the body particles in the muller.

The following examples are typical for a core or a mold mixture, to wit:

Example No. 1

Dry weight, lbs.

Silica sand, 120 A.F.S., 95% -------------------- 95
Bentonite, western, 5% ------------------------ 5
Binder, 8% by weight of sand and bentonite mix ---- 8
Mull dry ingredients one (1) minute—add binder and mull two (2) minutes.

Example No. 2

Silica sand, 70 A.F.S., 65% --------------------- 65
Zirconium silicate, 120 A.F.S., 30% -------------- 30
Bentonite, western, 5% ------------------------ 5
Binder, 6% on weight of sand mix ---------------- 6
Mull dry ingredients one (1) minute—add binder and mull two (2) minutes.

After mulling the dry ingredients (the sand and bentonite, etc.) for a minute, the binder is added thereto and the same is then mulled for approximately two (2) minutes so as to thoroughly coat each granule of the body particles with the binding solution, the resulting "mixture" is processed in conventional manner in the use of molds for direct contact with the pattern, that is to say, the mixture is molded about the pattern, the pattern is stripped, and the mold is placed in an oven to cure, as is common and conventional with dry mold and core practice.

I have found that an oven temperature of approximately 450° F. is satisfactory, and that the oven time will vary from one hour to four hours, depending on the size or volume of the work or mold.

After the molds have been cured in the oven, the molds and cores are removed therefrom and cooled, and they are then ready for core setting and closing of the molds, and the metal pour.

I have found that by the use of my novel binder and mixture, and which is an inorganic binder, that the following features and advantages are obtainable, to wit: that the binder will bond all types of foundry grains, including the so-called synthetics; that the coating of the granules forming the body particles is easily accomplished, and that the binder has good wettability, resulting in good molding characteristics of the mixture which may be used on all conventional patterns regardless of the character of the materials that the patterns are made of; that the mixture provides a molding material that affords good pattern release from the mixture, and reduces the core oven curing time about 50% or more and at normal low temperatures of approximately 400° F. Also, when the mixture is used for large molds they may be torch or or burner cured; and practically no gas is generated in the mold when molten metal is introduced into the mold. A very fine facing grain body material treated with my novel binder may be employed to produce a high grade casting finish.

The resultant mixture is non-hydroscopic and is not hygroscopic and will not contaminate the contacting metal, whether ferrous or non-ferrous.

During the curing operation of the core and mold, no oxidation or polymerization occurs, and therefore there is no swell or sag of the core or mold, and the mixture is dimensionally stable.

The molds may be heated for hot mold pouring of metal, and good metal flow and lay of metal is obtained, as well as providing good friability and shake-out of the core and mold material.

As before stated there is no organic contamination of the mold body materials and the mold body materials (after use) may be broken up, the binding material again added thereto and then be re-used for a back-up material in subsequent molding operations; and the chemicals used in making the binder or binding material is non-toxic and will not injure the hands of the molders.

The usage and fabrication of the binder and refractory materials above referred to will vary in some instances, with the knowledge of those versed in the art, as will the methods of application of the mixture.

I claim:

1. An inorganic binder for refractory materials consisting essentially of about 60% to 80% of monoaluminum phosphate and 20% to 40% sodium hexametaphosphate, the total aggregating about 100%.

2. The binder of claim 1 dissolved in water to form an aqueous solution thereof.

3. The binder solution of claim 2, wherein said water constitutes 5% to 20% by weight of said inorganic binder.

4. The binder solution of claim 2, having admixed therewith a particulate refractory material.

5. The binder solution of claim 2, having admixed therewith a particulate refractory material, said binder solution constituting approximately 6% to 8% by weight of said particulate material.

References Cited in the file of this patent

UNITED STATES PATENTS

| | | |
|---|---|---|
| 1,751,482 | Leasman | Mar. 25, 1930 |
| 2,522,548 | Streicher | Sept. 19, 1950 |
| 2,538,867 | Greger | Jan. 23, 1951 |
| 2,682,092 | Henricks | June 29, 1954 |
| 2,930,709 | Herman | Mar. 29, 1960 |
| 2,995,453 | Noble | Aug. 8, 1961 |

FOREIGN PATENTS

| | | |
|---|---|---|
| 508,327 | Belgium | Jan. 31, 1952 |
| 715,020 | Great Britain | Jan. 9, 1951 |